(12) United States Patent
Kurabayashi

(10) Patent No.: US 6,908,412 B2
(45) Date of Patent: Jun. 21, 2005

(54) CONTROL APPARATUS FOR CONTINUOUSLY VARIABLE TRANSMISSION

(75) Inventor: Masahiko Kurabayashi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/229,141

(22) Filed: Aug. 28, 2002

(65) Prior Publication Data
US 2003/0045394 A1 Mar. 6, 2003

(30) Foreign Application Priority Data
Aug. 31, 2001 (JP) ........................................ 2001-263782

(51) Int. Cl.$^7$ .............................................. B60K 41/12
(52) U.S. Cl. ............................ 477/44; 477/47; 477/68; 477/118; 477/120
(58) Field of Search .............................. 477/44, 46, 47, 477/68, 92, 118, 120, 183–185, 186, 187, 904

(56) References Cited

U.S. PATENT DOCUMENTS

| | | | | |
|---|---|---|---|---|
| 4,590,561 A | * | 5/1986 | Abo et al. ................... | 701/55 |
| 4,641,553 A | * | 2/1987 | Kobayashi ................... | 74/866 |
| 5,007,147 A | | 4/1991 | Imai et al. | |
| 5,025,684 A | * | 6/1991 | Stehle et al. ................ | 477/62 |
| 5,088,355 A | * | 2/1992 | Sugaya et al. ............... | 74/868 |
| 5,474,505 A | * | 12/1995 | Seidel et al. ................ | 477/49 |
| 5,754,428 A | * | 5/1998 | Ishikawa ..................... | 701/55 |
| 5,871,416 A | * | 2/1999 | Sawada et al. ............... | 477/47 |
| 5,925,087 A | * | 7/1999 | Ohnishi et al. .............. | 701/70 |

FOREIGN PATENT DOCUMENTS

| | | | | | |
|---|---|---|---|---|---|
| JP | 61119437 A | * | 6/1986 | ................. | 474/19 |
| JP | 01195145 A | * | 8/1989 | ......... | B60K/41/14 |
| JP | 9-166216 | | 6/1997 | | |

* cited by examiner

Primary Examiner—Tisha Lewis
(74) Attorney, Agent, or Firm—McGinn & Gibb, PLLC

(57) ABSTRACT

When an operator takes his foot from an accelerator pedal, a returning speed of the accelerator pedal is calculated from a signal of an accelerator sensor. In case where the returning speed is larger than a reference value, it is judged that the operator intends to decelerate a vehicle with an engine brake applied and the speed ratio of the continuously variable transmission is fixed to a value at the moment when the operator releases the accelerator pedal. As a result, the vehicle decelerates while the engine brake is exerted. In case where the returning speed is smaller than the reference value, it is judged that the operator intends to run the vehicle by inertia and the speed ratio of the transmission is changed to a speed ratio on an overdrive side so as to allow a coasting operation.

10 Claims, 5 Drawing Sheets

RF:SPEED RATIO AT F

Ro:SPEED RATIO IN OVERDRIVE

CONTROL APPARATUS FOR CONTINUOUSLY VARIABLE TRANSMISSION

BACKGROUND OF THE INVENTION

1. Field of the Invention

The present invention relates to a control apparatus for a continuously variable V-belt transmission and more particularly to the control apparatus capable of selecting either a coast down operation or a deceleration with engine brake applied by detecting an intention of a vehicle operator.

2. Discussion of Prior Art

A V-belt type continuously variable transmission used for an automobile power transmission apparatus includes a primary shaft connected with a crankshaft of an engine, a primary pulley provided on the primary shaft and whose width of a groove of the pulley is variable, a secondary shaft as an output shaft, a secondary pulley provided on the secondary shaft and a drive belt looped over these two pulleys. Engine speed is continuously changed by changing a ratio of winding diameters of the drive belt on the respective pulleys and is transmitted to the secondary shaft.

Japanese Patent Application Laid-open No. Toku-Kai-Hei 9-166216 discloses a control apparatus for controlling a ratio of winding diameters of a drive belt to pulleys, namely a speed ratio. The control apparatus inputs signals indicative of accelerator pedal opening angles, primary pulley speeds, secondary pulley speeds, vehicle speeds, engine speeds and the like and performs a control of speed ratio based on these input signals.

In the control apparatus, when an operator takes his or her foot from an accelerator pedal during operating a vehicle, the speed ratio is controlled so as to be shifted up in order to improve fuel economy and to enhance driveability. Accordingly, when the accelerator pedal is released, the speed ratio is stuck to an over-drive position and the vehicle travels by inertia with an engine brake applied.

On the other hand, when the vehicle driver releases the accelerator pedal, he or she sometimes intends to decelerate the vehicle while engine brake is exerted. For example, when the vehicle travels on winding roads, since moderate engine brakes are obtained by easing his or her foot off the accelerator pedal, the frequency of depressing a brake pedal for deceleration decreases and as a result the a burden of the operator can be substantially reduced. However, when the operator takes his or her foot from the accelerator pedal, the prior control apparatus fixes the speed ratio to an overdrive position and the vehicle runs by inertia irrespective of an intention of the operator. As a result, the operator must depress the brake pedal for deceleration after taking the foot from the accelerator pedal.

SUMMARY OF THE INVENTION

It is an object of the present invention to provide a control apparatus of a V-belt type continuously variable transmission capable of decelerating a vehicle according to an intention of a vehicle operator.

To attain the object, a control apparatus of a V-belt type continuously variable transmission comprises a deceleration intention judging means for judging whether the operator intends to decelerate a vehicle with an engine brake applied or an operator intends to run the vehicle by inertia and a speed ratio fixing means for fixing the speed ratio to a value at the moment when the operator release the accelerator pedal when it is judged that the operator intends to decelerate the vehicle with an engine brake applied. The control apparatus further comprises a coasting means for changing said speed ratio to a value on a minimum speed ratio side when it is judged that the operator intends to run the vehicle by inertia.

DESCRIPTION OF THE PREFERRED EMBODIMENT

Figure 1:
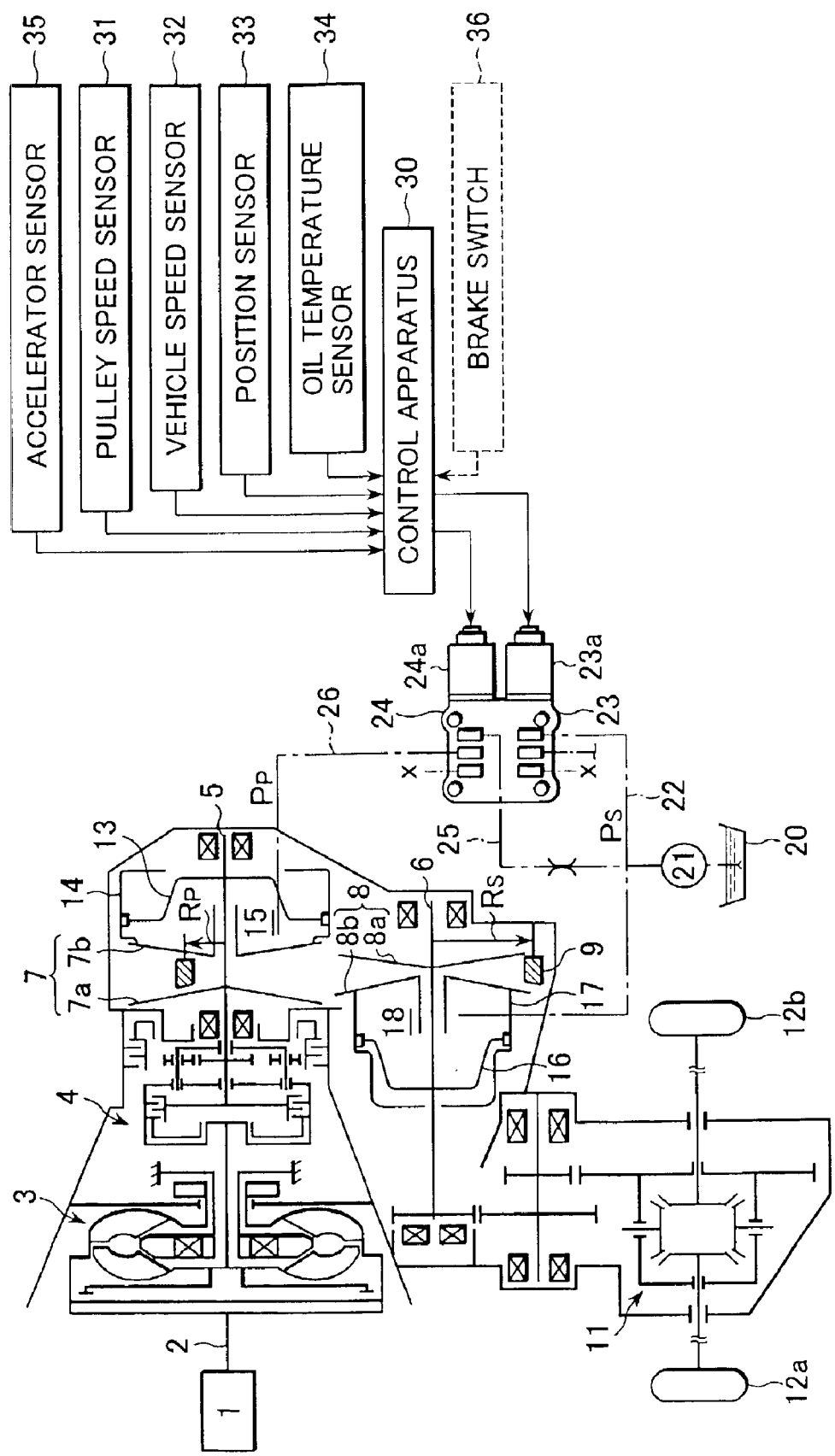
FIG. 1 is a schematic view showing a drivetrain of a V-belt type continuously variable transmission according to the present invention.

Referring now to FIG. 1, reference numeral 1 denotes an engine and reference numeral 2 denotes a crankshaft 2 driven by the engine 1. In the drawing, the continuously variable transmission has a torque converter 3 connected with the crankshaft 2, a forward and reverse changeover apparatus 4, a primary shaft 5 and a secondary shaft 6 provided in parallel with the primary shaft 5. Rotation of the engine 1 is transmitted to the primary shaft 5 through the crankshaft 2, the torque converter 3 and the forward and reverse changeover apparatus 4 and the primary shaft 5 drives the secondary shaft 6.

There is provided a primary pulley 7 on the primary shaft 5. The primary pulley 7 has a fixed sheave 7a integrally connected with the primary shaft 5 and a displaceable sheave 7b slidably in an axial direction fitted over the primary shaft 5 through a ball spline and provided opposite to the fixed sheave 7a so as to vary a groove width of the primary pulley 7. Similarly, the secondary pulley 8 has a fixed sheave 8a integrally connected with the secondary shaft 6 and a displaceable sheave 8b slidably in an axial direction fitted over the secondary shaft 6 and provided opposite to the fixed sheave 8a so as to vary a groove width of the secondary pulley 8.

The primary pulley 7 is connected with the secondary pulley 8 through a drive belt 9 wound therearound. The rotation speed of the secondary shaft 6 with respect to the primary shaft 5 is continuously changed by changing the groove width of both pulleys 7,8 to vary a ratio of winding diameters of the drive belt 9 on the respective pulleys. Letting a winding diameter of the drive belt 9 on the primary pulley 7 be $R_p$ and letting a winding diameter of the drive belt 9 on the secondary pulley 8 be $R_s$, a speed reduction ratio R is expressed as $R=R_s/R_p$.

The rotation of the secondary shaft 6 is transmitted to drive wheels 12a, 12b through gear trains including a reduction gear and a differential 11.

To change the groove width of the primary pulley 7, a plunger 13 is secured to the primary shaft 5 and a primary cylinder 14 slidably contacts the outer periphery of the plunger 13. The primary cylinder 14 is secured to the displaceable sheave 7b. Thus, a primary oil chamber 15 is formed by the plunger 13 and the primary cylinder 14. On the other hand, a plunger 16 is secured to the secondary shaft 6 and a secondary cylinder 17 slidably contacts the outer periphery of the plunger 16. The secondary cylinder 17 is secured to the displaceable sheave 8b. Thus, a secondary oil chamber 18 is formed by the plunger 16 and the secondary cylinder 17. Accordingly, when working fluid is fed to the primary oil chamber 15 and the volume of the primary oil chamber 15 increases, the displaceable sheave 7b is displaced towards the fixed sheave 7a together with the primary cylinder 14 to reduce the groove width and when the volume of the primary oil chamber 15 decreases, the groove width increases. Further, when working fluid is fed to the secondary oil chamber 18 and the volume of the secondary oil chamber 18 increases, the displaceable sheave 8b is displaced towards the fixed sheave 8a together with the secondary cylinder 17 to reduce the groove width and when the volume of the secondary oil chamber 18 decreases, the groove width increases. Groove widths of the respective pulleys are established by regulating a primary pressure $P_p$ fed to the primary oil chamber 15 on the primary side and a secondary pressure $P_s$ fed to the secondary oil chamber 18 on the secondary side.

Working fluid of an oil pan 20 is supplied to the respective oil chambers 15, 18 by an oil pump 21 driven by the engine 1 or an electric motor. A line pressure passage, namely a secondary pressure passage 22 connected with a discharge port of the oil pump 21 communicates with the secondary oil chamber 18 and at the same time with a secondary pressure port of a secondary pressure regulating valve 23. The secondary pressure Ps fed to the secondary oil chamber 18 is regulated to a pressure corresponding to a transmission capacity between the drive belt 9 and the secondary pulley 8 by the secondary pressure regulating valve 23. That is, when an output of the engine 1 is large as in a case where a vehicle travels on grades or makes a sharp acceleration, the secondary pressure $P_s$ is raised to prevent a slippage of the drive belt 9 and when an output of the engine 1 is small, the secondary pressure $P_s$ is lowered to save a pumping loss of the oil pump 21 and to enhance a transmission efficiency of the continuously variable transmission.

The secondary pressure passage 22 communicates with a secondary pressure port of a primary pressure regulating valve 24 and a primary pressure port of the primary pressure regulating valve 24 communicates with the primary oil chamber 15 on the primary side through a primary pressure passage 26. The primary pressure Pp is regulated to a value corresponding to a target speed ratio, a vehicle speed and the like by the primary pressure regulating valve 24 to change the groove width of the primary pulley 7, whereby a speed ratio R is controlled. The secondary pressure regulating valve 23 and the primary pressure regulating valve 24 are a proportional solenoid valve, respectively. The secondary pressure $P_s$ and primary pressure $P_p$ are regulated respectively by controlling electric currents of the control apparatus 30 to solenoids 23a, 24a.

The control apparatus 30 inputs miscellaneous signals indicative of a revolution speed N of the primary pulley 7 from a pulley speed sensor 31, a vehicle speed V from a vehicle speed sensor 32, a position of a selector lever selected by a vehicle driver from a position sensor 33, a temperature of working fluid from an oil temperature sensor 34, an accelerator pedal opening angle from an accelerator sensor 35 and the like. The control apparatus 30 has a central processing unit for calculating current values to be fed to the respective solenoids 23a, 24a based on those signals from the respective sensors and memories for storing control programs, formulas, table data and the like.

Figure 2:
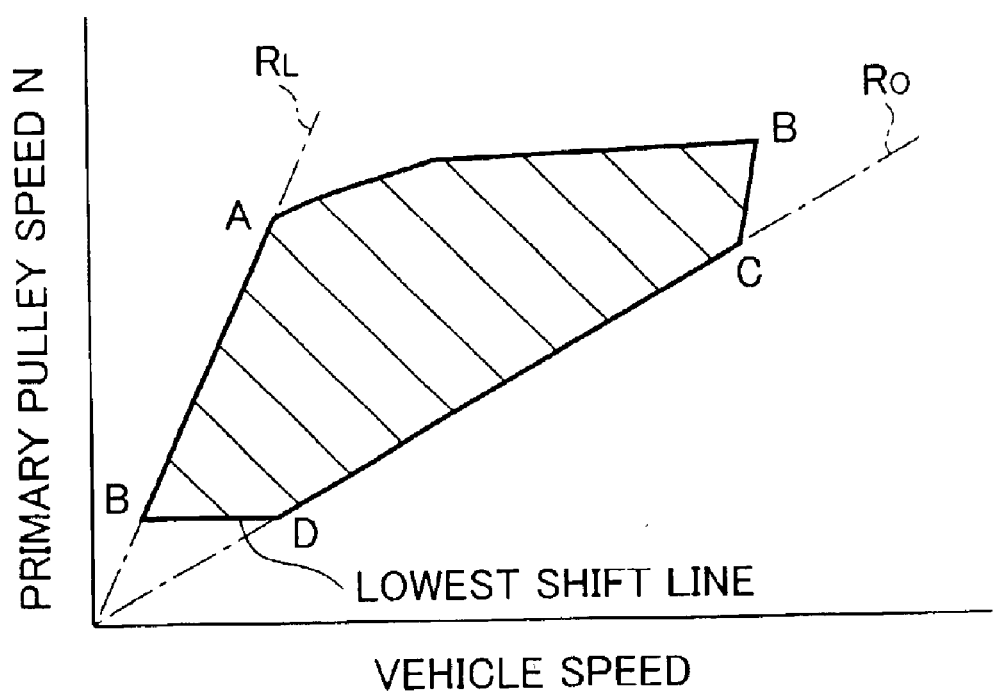
FIG. 2 is a graph showing a shift characteristic of the continuously variable transmission of FIG. 1.

Referring to FIG. 2, as a typical example, when the vehicle is accelerated with an accelerator pedal fully depressed, the vehicle reaches a point A with a speed ratio low "$R_L$" (maximum speed ratio) retained. After that, the revolution speed of the pulley 7 slightly increases and the vehicle reaches a point B while the speed ratio R is shifted to an overdrive "$R_o$" (minimum speed reduction ratio). When the vehicle driver takes his or her foot from the accelerator or when the vehicle driver applies brakes, the vehicle decelerates with a speed reduction ratio "$R_o$" retained via points C and D. Further, while going along a lowest shift line with a speed reduction ratio low "$R_L$", the vehicle reaches a point E and stops with a speed reduction ratio "$R_L$" retained. In case of an actual operation, the speed reduction ratio R of the vehicle varies discretionally within a hatched area enclosed by the speed reduction ratio on the low "$R_L$" side and the speed reduction ratio on the overdrive "$R_o$" side.

According to the belt type continuously variable transmission of the present invention, when the vehicle operator takes his or her foot from the accelerator pedal during driving, the shift schedule of the transmission is established to either "coasting" mode or "fixed speed ratio mode". The speed reduction ratio R varies according to these shift schedule modes. Hence, in the memories of the control apparatus 30, two tables, one is a deceleration table for a coasting mode and another is a deceleration table for a fixed speed ratio mode, are stored respectively. Further, the control apparatus 30 calculates an accelerator pedal returning velocity ($dL_x/dt$) when the vehicle operator easing the foot off the accelerator pedal based on a signal from the accelerator sensor 35. The shift schedule of the transmission is changed over between the fixed speed ratio mode and the coasting mode based on this accelerator pedal returning velocity.

Figure 3:
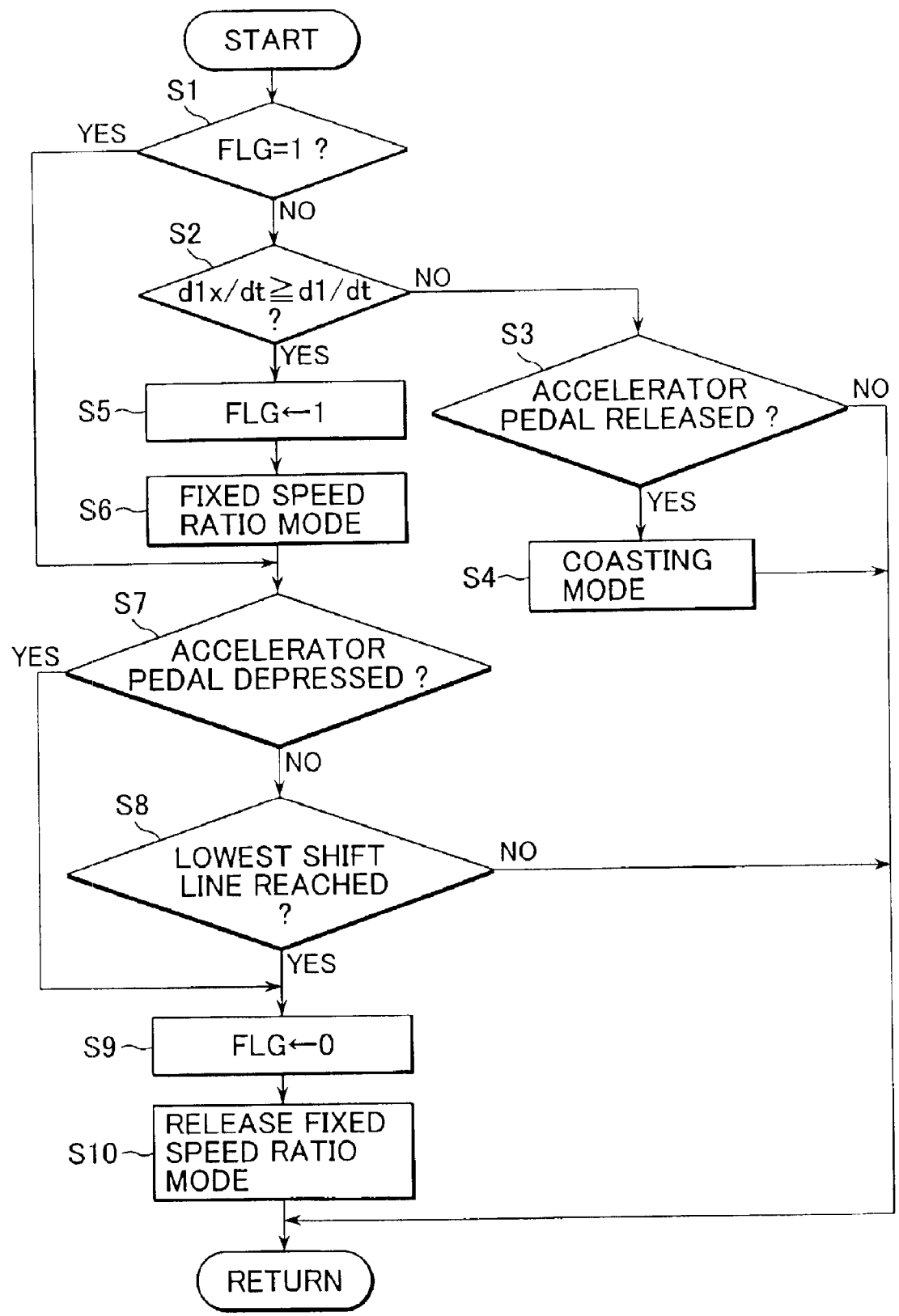
FIG. 3 is a flowchart showing steps for controlling a continuously variable transmission having a coasting mode and a fixed speed ratio mode.
Figure 4:
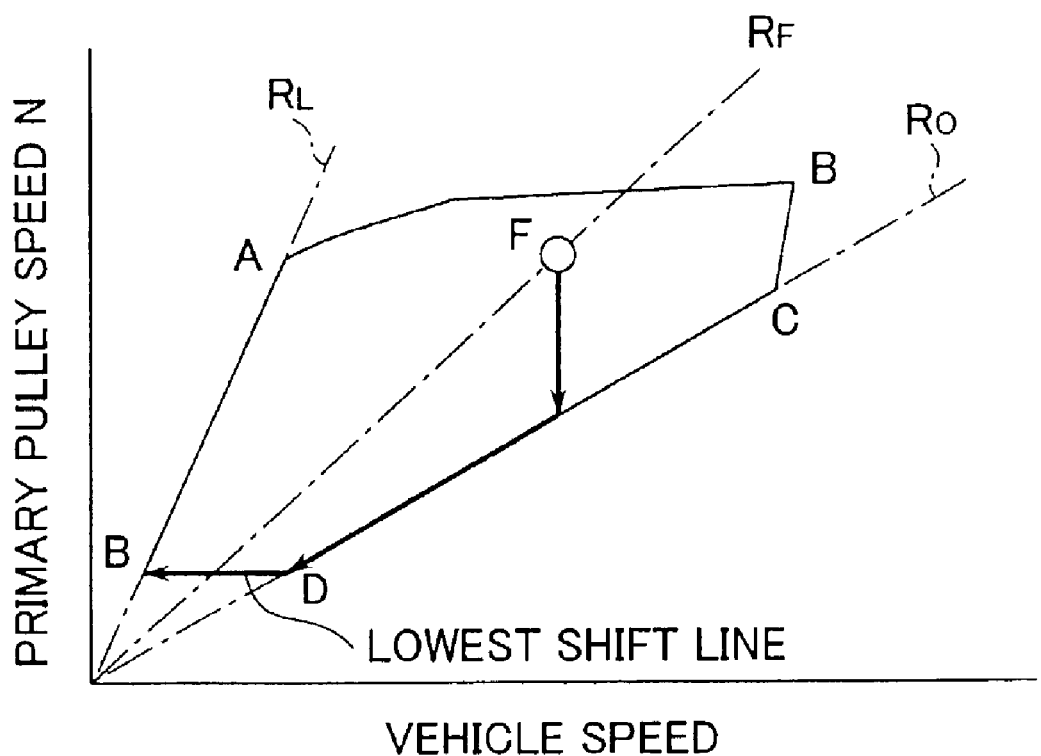
FIG. 4 is a graph showing a shift characteristic of the continuously variable transmission of FIG. 1 in a coasting mode.
Figure 5:
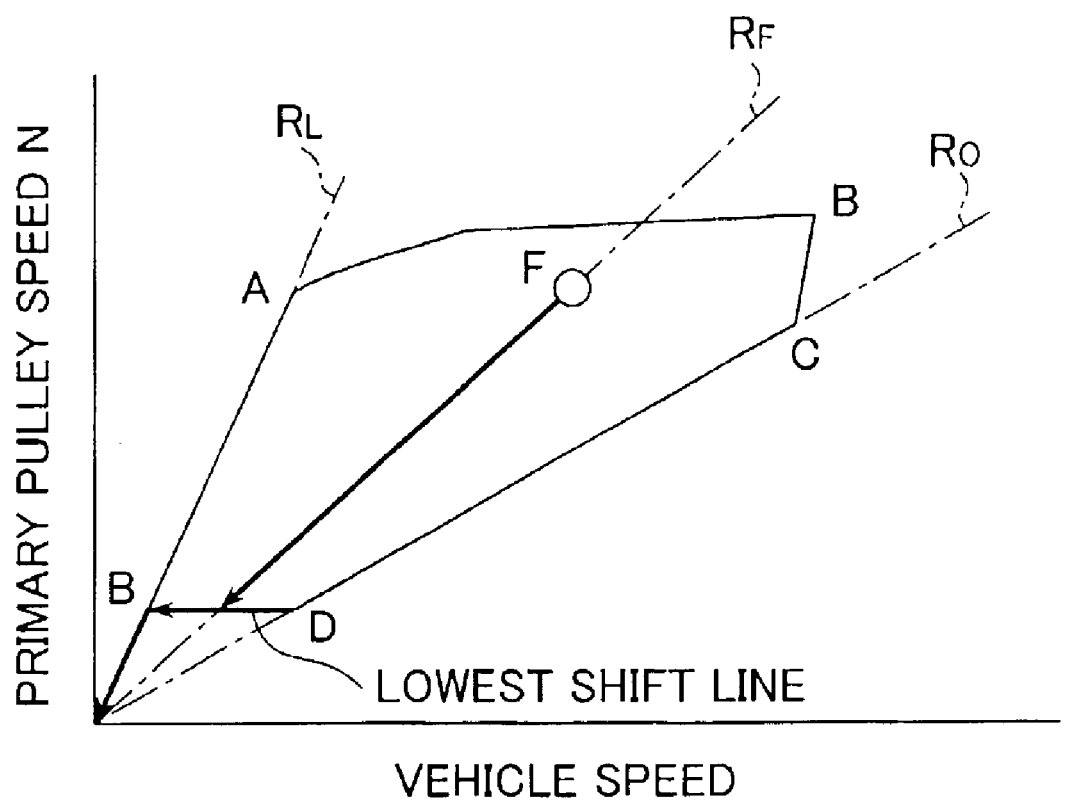
FIG. 5 is a graph showing a shift characteristic of the continuously variable transmission of FIG. 1 in a fixed speed ratio mode.

FIG. 3 is a flowchart showing steps in which either the coasting mode or the fixed speed ratio mode is selected. Further, FIG. 4 is a graph showing a shift characteristic when the coasting mode is selected and FIG. 5 is a graph showing a shift characteristic when the fixed speed ratio mode is selected.

[Coasting Mode]

The accelerator pedal returning velocity ($dL_x/dt$) when the driver eases his or her foot off the accelerator pedal and takes the foot from the accelerator pedal is detected and is compared with a reference value ($dL/dt$). If the accelerator pedal returning velocity is smaller than the criterion, the shift schedule is set to a coasting mode.

First, at a step S1, it is judged whether or not a flag has been set. If the flag is not set, the program goes to a step S2 where it is judged whether or not the returning velocity of the accelerator pedal ($dL_x/dt$) is larger than the reference value ($dL/dt$). In case where it is judged at the step S2 that the returning velocity of the accelerator pedal is smaller than the reference value, the program goes to a step S3 where it is judged whether or not the accelerator pedal is released. When it is judged that the accelerator pedal is released, at a step S4 the shift schedule is set to a coasting mode. That is, in case where the returning speed of the accelerator pedal of the operator is slower than the reference value and the accelerator pedal is in a released condition, the control apparatus making a judgment that the operator has no intention to apply engine brakes to the vehicle or preferably he intends to run the vehicle by inertia, the shift schedule is established to the coasting mode.

As shown in FIG. 4, in the coasting mode, when the operator returns the accelerator pedal at a point F, the speed ratio R is shifted from a speed ratio $R_F$ at the point F to an overdrive speed ratio $R_o$. The vehicle makes a deceleration toward a point D with a speed ratio fixed to the overdrive $R_o$. Therefore, the vehicle coasts down while the brake is insufficiently applied. This coasting mode is continued until it is judged at the step 3 that the operator presses the accelerator pedal again.

The shift schedule of the coasting mode shown in FIG. 4 is the same as a normal deceleration control of a conventional belt type continuously variable transmission without a mode changeover mechanism. In case of the conventional belt type continuously variable transmission, whenever the operator returns the accelerator pedal, the vehicle coasts down with a speed ratio R fixed to the overdrive $R_o$ irrespective of the operator's intention. Accordingly, when the operator returns the accelerator pedal with an intention to decelerate the vehicle by engine brake, the vehicle runs by inertia with insufficient engine brake and as a result the operator is required to press the brake pedal frequently for deceleration.

[Fixed Speed Ratio Mode]

On the other hand, in case where it is judged at the step S2 that the returning speed of the accelerator pedal is larger than the reference value, at a step S5 a flag is set and at a next step S6 the shift schedule is established to a fixed speed ratio mode. That is, in case where the returning speed of the accelerator pedal of the operator is larger than the reference value and the accelerator pedal is in a released condition, the control apparatus 30 judges that the operator has returned the accelerator pedal with an intention to decelerate the vehicle by engine brake and establishes the shift schedule to a fixed speed ratio mode.

Referring to FIG. 5, in the fixed speed ratio mode, when the operator returns the accelerator pedal at a point F, the speed ratio R is fixed to a speed ratio $R_F$. The vehicle decelerates with a speed ratio fixed to $R_F$. Consequently, the vehicle has an appropriate engine brake and the operator can obtain an intended deceleration of the vehicle.

Further, at steps S7 and S8, it is judged whether or not the accelerator pedal is depressed again or the vehicle continues a deceleration and reaches the lowest shift line. In case of NO at these steps S7 and S8, the program is returned and the fixed speed ratio is retained until either of the steps S7 and S8 obtains YES. When either of the steps S7 and S8 obtains YES, at a step S9 the flag is lowered and at a step S10 the fixed speed ratio mode is released.

In the aforesaid embodiment, the fixed speed ratio mode or the coasting mode are selected by the comparison of the returning speed of the accelerator pedal with the reference value indicative of an operator's intention, however the present invention is not limited to this. A closing speed of a throttle valve (not shown) of the engine 1 may be substituted for the returning speed of the accelerator pedal. Further, in place of the accelerator sensor 35, a brake switch 36 may be used for detecting an operator's intention of deceleration. When the brake pedal is pressed, it is judged that the operator has an intention of deceleration and the shift schedule is set to the fixed speed ratio mode.

When it is judged that the operator has an intention to decelerate the vehicle with an engine brake applied, the shift schedule is established to a fixed speed ratio mode so as to generate a moderate engine brake, when it is judged that the operator has an intention to run the vehicle by inertia, the shift schedule is established to a coasting mode so as not to generate an engine brake. Thus, the control apparatus of a V-belt type continuously variable transmission according to the present invention enables a vehicle to make a deceleration with an operator's intention.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control apparatus of a continuously variable transmission having a drive belt looped over a primary pulley and a secondary pulley for transmitting a power of an engine from said primary pulley to said secondary pulley and capable of continuously varying a speed ratio of said transmission by changing a ratio of winding diameters of said drive belt to said primary pulley and said secondary pulley, comprising:

a deceleration intention judging means for judging whether an operator intends to decelerate a vehicle with an engine brake applied or said operator intends to run said vehicle by inertia;

a speed ratio fixing means for fixing said speed ratio to a value at the moment when said operator releases an accelerator pedal when it is judged that said operator intends to decelerate said vehicle with said engine brake applied; and a coasting means for changing said speed ratio to a value on a minimum speed ratio side.

2. The control apparatus according to claim 1, wherein said coasting means changes said speed ratio to said value on said minimum speed ratio side when it is judged that said operator intends to run said vehicle by inertia.

3. The control apparatus according to claim 1, wherein said deceleration intention judging means judges that when a returning speed of an accelerator is larger than a specified value, said operator is intending to decelerate said vehicle with said engine brake applied and that when said returning speed is smaller than said specified value, said operator is intending to run said vehicle by inertia.

4. The control apparatus according to claim 1, wherein said deceleration intention judging means judges that when a closing speed of a throttle valve of said engine is larger than a specified value, said operator intends to decelerate said vehicle with said engine brake applied and that when said closing speed is smaller than said specified value, said operator intends to run said vehicle by inertia.

5. The apparatus of claim 1, wherein said deceleration intention judging means comprises:

an accelerator sensor generating an accelerator pedal angle signal; and a transmission ratio controller receiving said accelerator pedal angle signal, wherein said transmission ratio controller determines whether said operator intends to decelerate said vehicle with said engine brake applied or said operator intends to run said vehicle by inertia based upon said accelerator pedal angle signal.

6. The apparatus of claim 1, wherein said deceleration intention judging means comprises:

a throttle position sensor generating a throttle position signal; and a transmission ratio controller receiving said throttle position signal, wherein said transmission ratio controller determines whether said operator intends to decelerate said vehicle with said engine brake applied or said operator intends to run said vehicle by inertia based upon said throttle position signal.

7. The apparatus of claim 1, wherein said speed ratio fixing means comprises:
 a transmission ratio controller that fixes said speed ratio when said deceleration intention judging means determines that said operator intends to decelerate said vehicle with said engine brake applied.

8. The apparatus of claim 1, wherein said coasting means comprises:
 a transmission ratio controller that changes said speed ratio when said deceleration intention judging means determines that said operator intends to run said vehicle by inertia.

9. A control apparatus of a continuously variable transmission having a drive belt looped over a primary pulley and a secondary pulley for transmitting a power of an engine from said primary pulley to said secondary pulley and capable of continuously varying a speed ratio of said transmission by changing a ratio of winding diameters of said drive belt to said primary pulley and said secondary pulley, comprising:
 a deceleration intention judging means for judging whether an operator intends to decelerate a vehicle with an engine brake applied or said operator intends to run said vehicle by inertia; and
 a speed ratio fixing means for fixing a said speed ratio to a value at the moment when said operator releases an accelerator pedal when it is judged that said operator intends to decelerate said vehicle with an engine brake applied, wherein said deceleration intention judging means judges that when a returning speed of an accelerator is larger than a specified value, said operator is intending to decelerate said vehicle with said engine brake applied and that when said returning speed is smaller than said specified value, said operator is intending to rim said vehicle by inertia.

10. A control apparatus of a continuously variable transmission having a drive belt looped over a primary pulley and a secondary pulley for transmitting a power of an engine from said primary pulley to said secondary pulley and capable of continuously varying a speed ratio of said transmission by changing a ratio of winding diameters of said drive belt to said primary pulley and said secondary pulley, comprising:
 a deceleration intention judging means for judging whether an operator intends to decelerate a vehicle with an engine brake applied or said operator intends to run said vehicle by inertia; and
 a speed ratio fixing means for fixing said speed ratio to a value at the moment when said operator releases an accelerator pedal when it is judged that said operator intends to decelerate said vehicle with an engine brake applied, wherein said deceleration intention judging means judges that when a closing speed of a throttle valve of said engine is larger than a specified value, said operator intends to decelerate said vehicle with said engine brake applied and that when said closing speed is smaller than said specified value, said operator intends to run said vehicle by inertia.

* * * * *